United States Patent [19]
Shapiro

[11] 3,746,343
[45] July 17, 1973

[54] MAGNETIC GAME BOARD ESPECIALLY FOR SIGHTLESS PERSONS

[76] Inventor: D. Morris Shapiro, 937 W. 1820 S., Salt Lake City, Utah 84104

[22] Filed: Dec. 14, 1971

[21] Appl. No.: 207,780

[52] U.S. Cl. .................. 273/136 B, 273/DIG. 27
[51] Int. Cl. ............................................. A63f 3/02
[58] Field of Search.................. 273/131, 135, 136, 273/130

[56] References Cited
UNITED STATES PATENTS

| | | | |
|---|---|---|---|
| 1,016,187 | 1/1912 | Vacek | 273/131 K |
| 1,546,831 | 7/1925 | Fritz | 273/131 B |
| 2,464,146 | 3/1949 | Mohler | 273/135 B |
| 2,951,703 | 9/1960 | Arnold | 273/136 B X |
| 3,082,004 | 3/1963 | Friedman | 273/130 A |
| 3,531,122 | 9/1970 | Peebles | 273/136 E |

FOREIGN PATENTS OR APPLICATIONS

| | | | |
|---|---|---|---|
| 2,006,652 | 9/1970 | Germany | 273/136 C |
| 926,079 | 5/1963 | Great Britain | 273/136 B |

*Primary Examiner*—Delbert B. Lowe
*Attorney*—B. Deon Criddle

[57] ABSTRACT

A game board including an essentially rigid metallic backing which is sensitive to magnetic forces, a playing surface positioned thereover and a grid arranged to be reflective of the playing surface. The grid is constructed so as to form a pattern of raised ridges surrounding depressions reflecting a game pattern and shape on the playing surface. Braille characters projecting from the top of the grid enable a blind player to identify the game pattern reflected by the individual depressions and to locate the positions of game playing pieces. Playing pieces having Braille characters thereon, and magnets attached thereto, are fitted into and are magnetically held within the depressions in the grid. Holes are punched along one edge of the game board to conform with the rings of a loose leaf binder so that one or more game boards can be arranged in the form of book pages.

7 Claims, 2 Drawing Figures

PATENTED JUL 17 1973

3,746,343

INVENTOR:
D. MORRIS SHAPIRO
BY:
ATTORNEY

MAGNETIC GAME BOARD ESPECIALLY FOR SIGHTLESS PERSONS

BRIEF DESCRIPTION OF THE INVENTION

1. Field of the Invention

This invention relates to magnetic game boards constructed so as to be used by either blind persons or persons with sight.

2. Prior Art

Magnetic game boards and individual playing pieces magnitized to be held on the boards have long been known and used. Also, it has long been well known to use Braille characters to enable a blind person to "see" with his fingers. However, to the best of my knowledge there has not heretofore been known a magnetic game board having a grid covering with depressions formed between raised ridges, so that an essentially flat playing surface is maintained even when playing pieces are placed thereon. Neither, to my knowledge, has there heretofore been such a game board wherein a simple Braille character arrangement allows a blind user to instantly identify a particular depression. The same Braille characters also allow a blind player to run his fingers over the playing surface and to determine from the alignment of a number of Braille characters the same pattern on the game board that is readily visible to persons with sight.

SUMMARY OF THE INVENTION

Principal objects of the present invention are to provide a magnetic game board for use by blind or sighted persons whereon a game of skill, such as chess or checkers, can be played.

Another object is to provide a grid arrangement over the playing surface with the grid having depressions in it which correspond to markings on the playing surface and will receive playing pieces used in the game. Braille characters projecting from the grid surface provide means whereby the arrangement of markings can be rapidly identified.

Another object is to provide a unique Braille-like arrangement whereby the pattern on the playing surface can be immediately ascertained by a blind person.

Still another object is to provide playing pieces having Braille characters thereon, whereby they are easily identified by a blind person, and to dimension such playing pieces such that their top surfaces are only slightly above or are essentially flush with the top of the grid but are below a marginal border or lip surrounding the game board, to allow stacking of a number of game boards.

Principal features of the present invention comprise a game board including a sheet of magnetically sensitive metal beneath a playing surface. A grid webbing of depressions and ridges overlies the playing surface. This webbing is preferably constructed by injection molding and corresponds to a game pattern on the playing surface. Depressions and ridges are included at top and bottom edges of the board wherein spare or captured playing pieces are stored.

The grid webbing has Braille characters protruding from its ridges. The characters enable a blind player to identify the exact location of any individual marking on the playing surface. Such characters can represent an international system of numbers and letters to allow a blind person to establish the same coordinate references by numbers and letters that are seen by a person with sight. In addition, Braille type characters are used on the interstices of the grid webbing in such a manner that a blind person can easily distinguish the pattern of the board beneath the webbing.

The individual playing pieces have Braille characters protruding from their top surfaces to identify particular playing pieces. The playing pieces also have permanent magnets attached to their undersides and the magnets are dimensioned and shaped to fit within the depressions formed between the ridges in the grid webbing and the game board surface. The playing pieces are constructed so as to project minimally above the webbing and to be below a marginal border or lip surrounding the game board. A number of game boards, with playing pieces positioned thereon, can thereby be stacked one on top of another or can be arranged as leaves of a book without disturbing the positioning of the individual playing pieces. A number of game boards, with games in progress, can therefore be combined together in a loose leaf type binder so that a player can simultaneously play a number of different opponents from a book-like arrangement of game boards.

Additional objects and features of the invention will become apparent from the following detailed description and drawings, disclosing what is presently contemplated as being the best modes of the invention.

THE DRAWINGS

FIG. 1 is a top plan view of the game board of the invention showing the Braille markings on the grid, and with several playing pieces positioned thereon; and FIG. 2, an enlarged fragmentary vertical section view taken within line 2—2 of FIG. 1.

DETAILED DESCRIPTION

Figure 1:
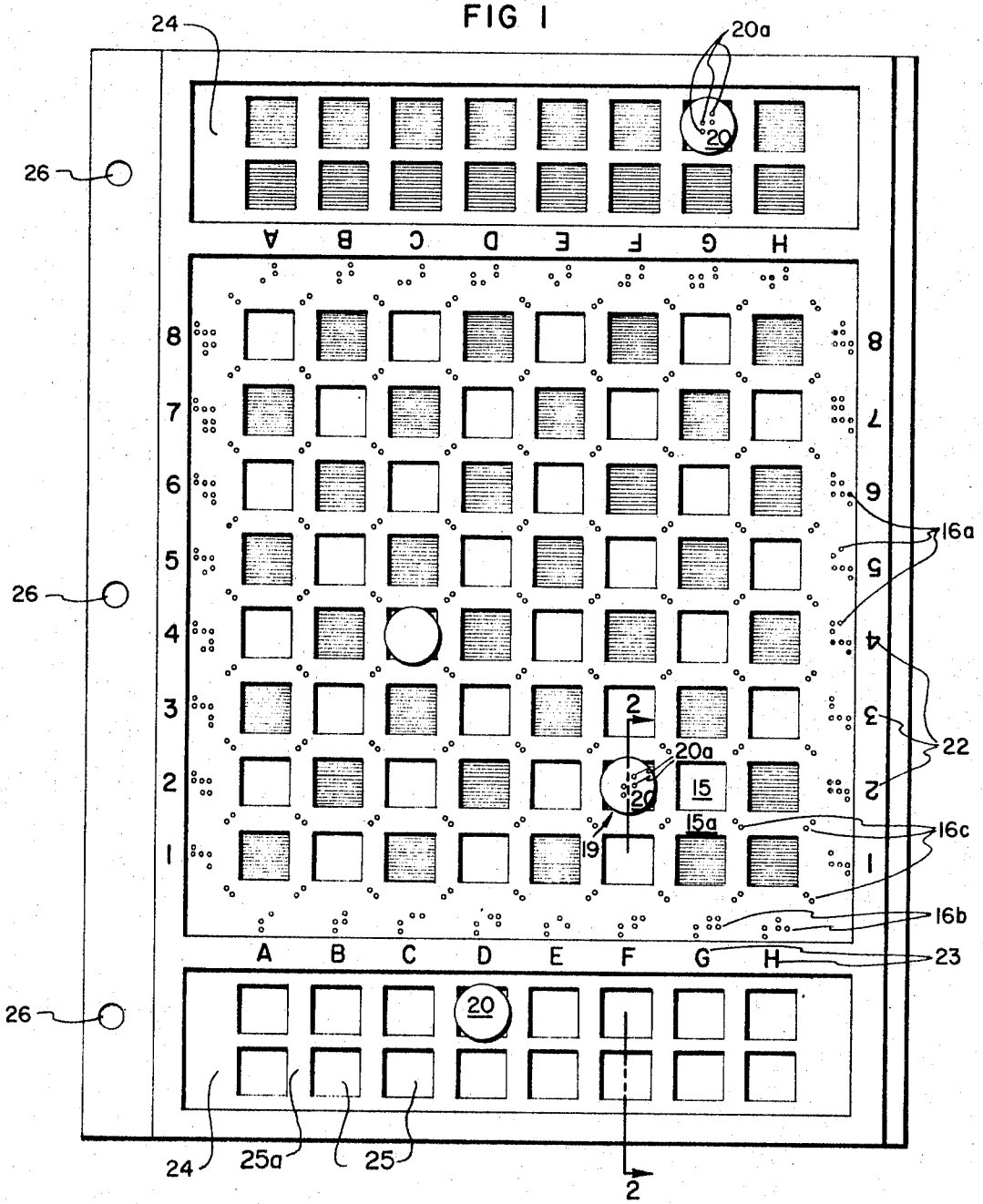
Figure 2:
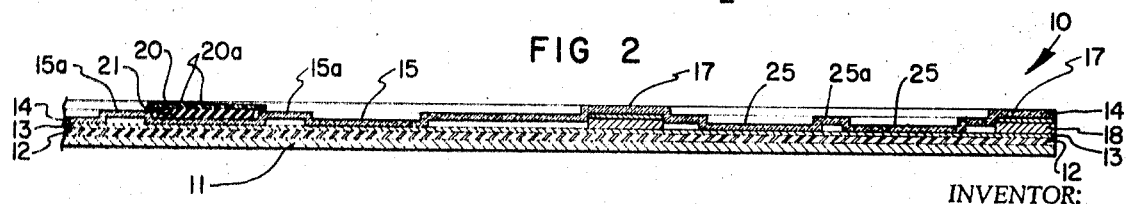

Referring now to the drawings:

The game board 10, shown in cross section in FIG. 2, has a stiffener member 11, made from firm cardboard, wood, plastic or any other suitable material which will lend rigidity to the structure. A thin sheet of metal 12, which will hold magnets is laminated to the stiffener member 11. A sheet of paper or other suitable material, having a playing surface 13 shown herein as a checkerboard having black and white squares scribed thereon, is laminated to the metal sheet 12. Obviously, the playing surface could be painted or printed or otherwise applied directly to the metal sheet 12. A grid type webbing 14 is preferably a transparent plastic material, and is secured on playing surface 13. The webbing 14 has depressions 15 formed between ridges 15a, which depressions 15 correspond to, and overlie, the black and white squares on the playing surface 13. The ridges 15a have Braille symbols 16a, 16b and 16c formed thereon. An upstanding ridge or lip 17 surrounds the playing surface. The lip 17 is raised somewhat above ridges 15a extends around the border of the game board and is supported by an upstanding ridge 18, that stands above the stiffener member 11, and is supported on the playing surface 13. The upstanding ridge 18 adds rigidity to the lip 17 so as to allow additional flat surfaces to be stacked thereon. Although not shown, it will be apparent that depending upon the materials used and the manner of construction, the grid type webbing 14, the playing surface 13, and the stiffener member 11 can be formed as one integral member, with the metal sheet 12 arranged therebelow.

A playing piece 19, consisting of disk 20, shown to be round, but which may be of any desired shape, having Braille symbols 20a projecting upwardly from it is fixed to a permanent magnet 21. Magnet 21 has dimensions which allow it to fit within one of the depressions 15 formed within the grid type webbing 14. Magnet 21 is held within the depression 15, between ridges 15a, by magnetic attraction to the metal sheet 12, and is held against sliding movement by the ridges 15a. When the magnet 21 rests in depression 15, the playing piece disk 20 projects only slightly above ridges 15a such that border or lip 17, that surrounds the webbing 14, is somewhat above the top of disk 20. This construction allows another game board to be stacked thereon without disturbing individual playing pieces 19 thereon.

Braille characters 16a, 16b and 16c project from the top surface of the ridges 15a of the webbing 14, and reflect a numerical coordinate reference system of the invention composed of a series of numbers 22, which are represented by Braille characters 16a, arranged vertically from 1 to 8, along the sides of game board 10, with each number representing a row of squares. A row of letters 23, from A to H, represented by Braille characters 16b, representing vertical columns of squares are arranged across the top and bottom of the game board 10. A specific square can be located by reference to one of the vertical numbers 22 and reference to one letter of the row of letters 23. A typical coordinate reference would be to one of the letters such as B, and one of the numbers such as 2. To identify a particular square the reference would be B-2 or, using a name such as Bravo or Bill or the like to denote the letters, Bravo-2. A system of names can of course be used to denote each of the eight letters to facilitate the location of the individual squares. FIG. 1 shows the numbers and letters arranged for ease of reading from left to right by players seated opposite to one another. It should be understood that the numbers and letters on each side of the board can be scribed so as to read from the same direciton to accommodate a single player who manipulates all the playing pieces on the board in response to moves communicated to him from a distant player.

Similarly, it should also be understood that a second like playing surface could be placed behind the magnetic metal plate 12, so as to be opposite to the described surface. The second playing surface could reflect the board as an opposing player seated across from the first player would see if such that the order of the numbers 22 and letters 23 are reversed to reflect series from 8 to 1 and H to A. This arrangement enables players playing a game such as chess by designating white or black playing pieces reflective of the number and letter arrangements, to orient themselves for game play as if they were across from one another.

A number of boards can be arranged together in a loose leaf type arrangement such that a player can participate simultaneously in a number of games with different opponents.

Braille characters 16c protrude from the intersections of the grid webbing on ridges 15a and represent a system whereby a blind person can easily determine the game pattern beneath the grid webbing. FIG. 1 shows the symbols 16c as being two Braille-like characters projecting from the intersections of ridges 15a such that an imaginary line drawn through the two characters points towards a particular type or class of marking on the playing surface 13. The playing surface shown herein is a checker board arrangement with the Braille characters 16c pointing towards the white squares.

Without departing from the scope of the invention, it should of course be recognized that greater or lesser numbers of Braille-like characters could be used in various ways of other types of symbols, such as a line or the like, could identify a particular group of markings on the playing surface to allow a player to be able to determine with his finger tips the pattern on the playing surface.

Unused player storage areas 24 formed by depressions 25 and ridges 25a are located at the top and bottom of the game board to provide magnetically secured storage for unused playing pieces 19. The metal sheet 12 extends below storage area 24, so the magnets 21 of the playing pieces 19 are held thereon. Holes 26, appropriate for use with a binder, may be formed along an inside edge of the game board so that a number of game boards can be combined together in a loose leaf arrangement.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A magnetic game board particularly for use by sightless persons comprising
    a thin sheet of magnetic metal;
    a playing surface including game markings secured to said thin sheet of magnetic metal;
    playing pieces for use on the playing surface each having Braille-type characters protruding therefrom, identifying the playing piece, and a magnet secured to the surface of said playing piece opposite to said Braille-type characters;
    a coordinate reference system of Braille-type characters arranged with respect to said playing surface whereby a person, using his sense of touch, can locate specific game markings; and
    a game marking identification system of Braille-type characters arranged with respect to said game markings, the positioning and configuration of which Braille-type characters, with respect to a particular game marking, enables a sightless person, using his sense of touch, to readily identify specific game markings.

2. A magnetic game board especially for sightless persons as recited in claim 1, wherein
    the coordinate reference system of Braille-type characters consists of a vertical column of Braille-type characters representing a series of numbers extending along the sides of the game markings, each number representing a horizontal row of game markings, and a row of Braille-type characters representing a series of letters extending across the ends of said game markings, each letter representing a vertical column of game markings.

3. A magnetic game board especially for sightless persons as recited in claim 1, wherein the game markings consist of
    a plurality of Braille dots arranged and aligned to extend outwardly from alongside each said game marking such that a line drawn through at least two such aligned Braille dots will point to a particular class of game markings.

4. A magnetic game board especially for sightless persons as recited in claim 1, further including
a grid-type webbing secured above the playing surface such that ridge portions thereof extend alongside and separate the particular game markings, said coordinate reference system and said game marking identification systems of Braille-type characters being on said webbing.

5. A magnetic game board especially for sightless persons as recited in claim 4, wherein
the magnets fixed to the undersides of the playing pieces fit between the ridges of the grid-type webbing; and
the playing pieces extend above said ridges.

6. A magnetic game board for sightless persons as recited in claim 5, wherein
the playing pieces consist of a thin disk that is secured to the top of the magnet.

7. A magnetic game board especially for sightless persons as recited in claim 4, further including
a border formed around the perimeter of the playing surface, said border extending above the grid-type webbing, and above any playing pieces arranged between the ridges of said grid-type webbing.

* * * * *